United States Patent [19]

Carpenter et al.

[11] Patent Number: 4,496,916

[45] Date of Patent: Jan. 29, 1985

[54] SWITCH FUSE UNIT

[75] Inventors: Peter E. G. Carpenter, Newbury; Andrew P. Baker, Swindon, both of England

[73] Assignee: Square D Company, Palatine, Ill.

[21] Appl. No.: 461,287

[22] Filed: Jan. 27, 1983

[30] Foreign Application Priority Data

Mar. 22, 1982 [GB] United Kingdom ................. 8208253
Jan. 27, 1983 [GB] United Kingdom ................. 8202326

[51] Int. Cl.[3] ........................ H01H 85/00; H02B 1/18

[52] U.S. Cl. ........................................ 337/6; 337/146; 361/349

[58] Field of Search ............... 361/347, 349, 350, 357, 361/360; 337/4, 6, 145, 146; 200/50 A; 335/43

[56] References Cited

U.S. PATENT DOCUMENTS

| | | | |
|---|---|---|---|
| 2,900,473 | 8/1959 | Giessner | 335/43 |
| 3,015,709 | 1/1962 | Bodenschatz | 337/6 |
| 3,324,263 | 6/1967 | Onderko | 337/6 |
| 4,222,627 | 9/1980 | Cox | 361/349 |

FOREIGN PATENT DOCUMENTS

| | | | |
|---|---|---|---|
| 647497 | 8/1962 | Canada | 337/145 |

*Primary Examiner*—Harold Broome
*Attorney, Agent, or Firm*—L. I. Golden; M. R. Jankousky; R. T. Guttman

[57] ABSTRACT

A modular switch-fuse unit is provided which can be engaged via terminals 26 with a busbar supply system. The unit is divided into a switch compartment 14 and a fuse compartment 16, the latter having an access door 36 which is normally blocked by operating handle 38 when in the "on" position. Handle 38 is provided with a semi-concealed latch 64 allowing access to the fuses 32 when live.

7 Claims, 10 Drawing Figures

SWITCH FUSE UNIT

DESCRIPTION

This invention relates to a switch-fuse unit for industrial applications.

It is known to provide, in industrial power systems, a modular arrangement in which moulded-case circuit breakers of standard modular sizes may be plugged onto busbars; see for example British Pat. Nos. 1,161,030 and 1,181,893. One object of the present invention is to extend the usefulness of such arrangements by providing switch-fuse units which may be plugged onto the busbars as alternatives to the circuit breakers.

Accordingly, the invention provides a switch-fuse unit comprising a case of generally rectangular form, one or more inlet terminals positioned on one face of the case for resilient engagement with one or more respective busbars, the or each inlet terminal being connectable with an outlet terminal via switch contacts and a fuse link, and a switch operating mechanism, including an external handle, arranged to open and close the contacts in quick-make-and-break manner.

Preferably, the case is divided into a first compartment containing the switch mechanism and a second compartment for the fuse links; the second compartment is provided with a hinged access door and the handle is rotatable to an "on" position blocking opening of the access door.

Preferably also, the handle is in two parts normally held together by a spring catch which can be released by use of a suitable implement to permit opening of the access door with the switch "on". The arrangement is preferably such that on re-closing the access door the handle automatically reverts to its normal condition.

It is also preferred that the fuse compartment is arranged to accept readily a variety of standard fuse links and mounting arrangements.

An embodiment of the invention will now be described, by way of example, with reference to the accompanying drawings, in which.

Figure 1:
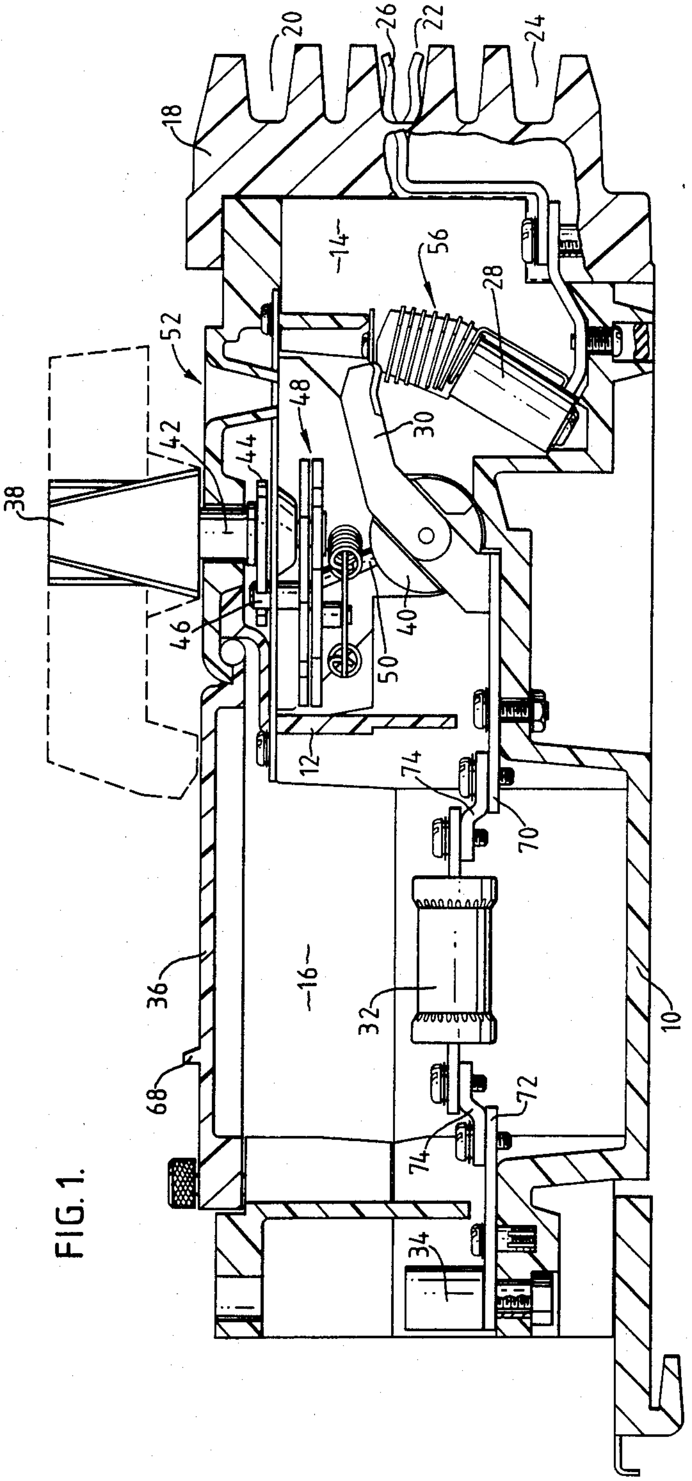
FIG. 1 is a cross-sectional elevation of a switch-fuse unit embodying the invention.

Referring to FIG. 1, the unit has a moulded plastics case 10 divided by a partition 12 into a switch compartment 14 and a fuse compartment 16. The unit would normally provide a switch and fuse on each of three phases, only one phase being seen in the drawings.

The input end of the case 10 is closed by a finned plastics block 18 forming three terminal channels 20,22,24; the input terminal 26 shown is positioned in the channel 22, while terminals for the other phases (not shown) would be within channels 20 and 24. This "stab and shroud" structure is designed for use with I-LINE (trade mark) busbar distribution boards produced by Square D Company and the subject of the above-mentioned patents.

The input terminal 26 is located on one face of the case 10 and is connected to a stationary switch contact 28 which cooperates with a movable switch contact blade 30 to make and break the circuit. Thereafter the circuit passes via a fuse link 32 to output terminal 34 located on one face of the case 10. It will be appreciated that fuse links for the other phases are aligned with the fuse link 32 and spaced therefrom in a direction perpendicular to the plane of the drawing.

The movable contact blade 30 is mounted, with those of the other phases, in slots in an insulating shaft 40 rotatably mounted within the case 10. The path of contact movement is within an arc chute 56 of known type. An external operating handle 38 secured to shaft 42 can be moved between the "off" position shown in full and the "on" position shown in broken lines. This rotates a claw member 44 secured to the shaft 42, which in turn drives a pin 46 which actuates a quick make and break mechanism generally indicated at 48 to drive a pin 50 secured to the shaft 40. The mechanism 48 is of the general type shown in British Pat. No. 1,170,720, which is incorporated herein by reference. However in the present arrangement, the claw member 44 replaces the lever 46 of the earlier patent. The pin 46 of the present arrangement has two functions:

(a) it transmits the drive from claw 44 to the lower plate, nearest the springs. In 1,170,720, the corresponding plate 35 receives the drive from lever 46 through its radial teeth or fingers 44;

(b) if the springs fail, it drives the upper plate, by bearing on the edge of a slot (not shown) and thence pin 50 in shaft 40. In 1,170,720, the equivalent action is provided by boss 48 disposed in slot 49 in plate 34.

A window 52 is provided for each switch blade, to allow visual observation of the blades when open. Preferably, the top part of the case 10 is moulded from a transparent polycarbonate material which is provided with an internal black coating (not shown) except in the areas of the windows 52. Indicia may suitably be applied to the inner face before the black coating is applied.

An access door 36 hinged to the case 10 and extending across the full width of the case permits access to the fuse compartment 16. As shown in broken lines, the handle 38 when in the "on" position is located across the door 36 and thus normally prevents access to the fuse compartment 16 when conductors therein are live.

Figure 2:
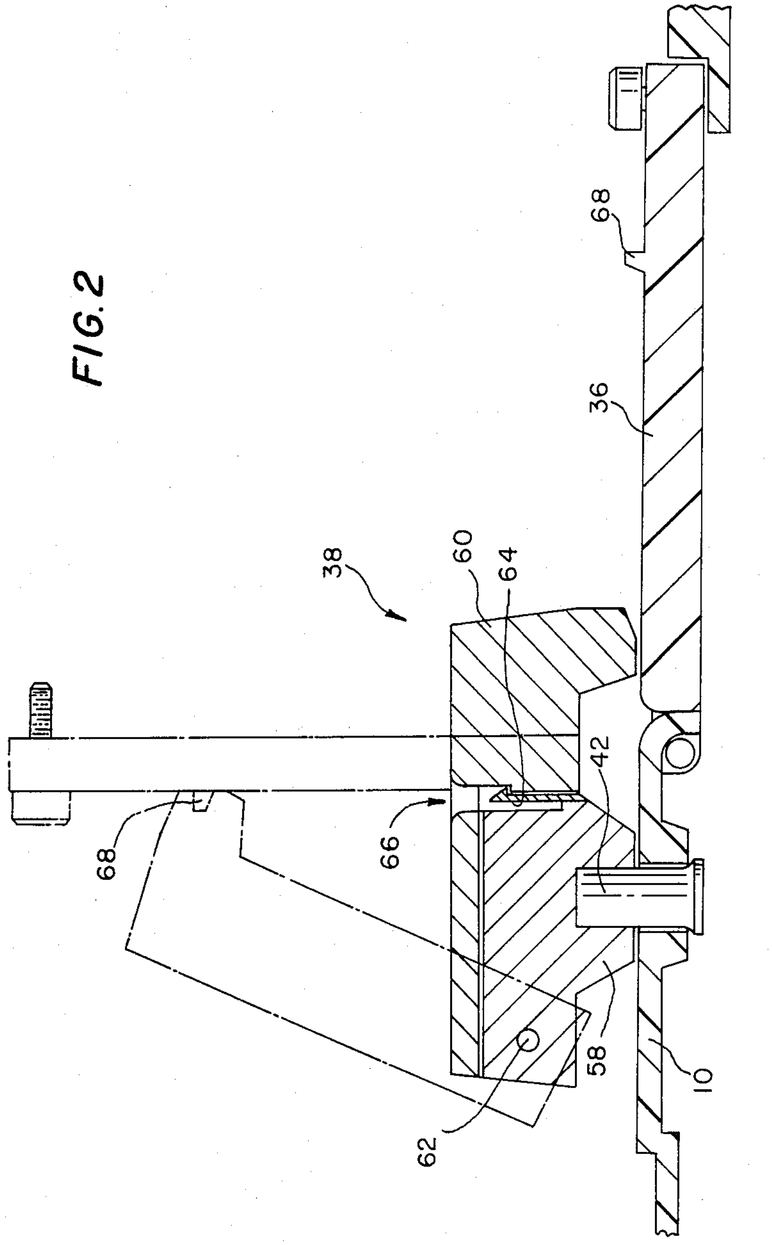
FIG. 2 is a partial cross-section, from the opposite side, illustrating the functioning of the operating handle.
Figure 2A:
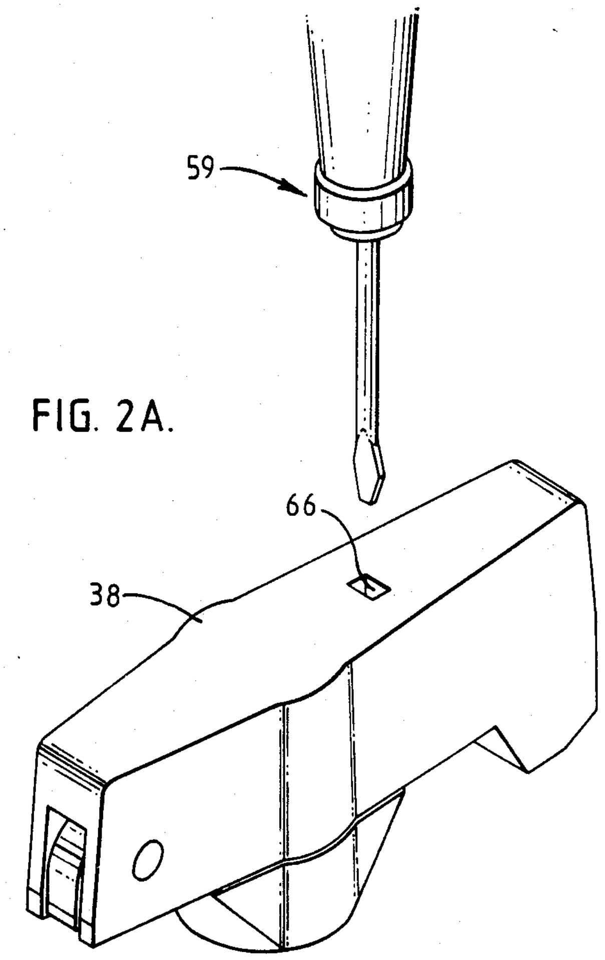
FIG. 2A is an isometric view of the operating handle and an implement.

Turning to FIG. 2, the handle 38 is so arranged that in the "on" position it can be moved clear of the access door 36 and thus permit access to live conductors in the fuse compartment 16. To this end, the handle comprises a base portion 58 and an elongate grip 60 pivoted together at 62. The grip 60 is normally held aligned with the case 10 by a spring tongue 64 integral with the base portion 58. However, a suitable implement 59 may be inserted through a narrow aperture 66 to disengage the detent of the tongue 64 and allow the grip 60 to be pivoted upwardly and the access door 36 opened. The tongue 64 could be a separate member secured (e.g. by riveting) to the base portion 58; alternatively, a spring tongue could be formed on or secured to the grip 60 for engagement with the base portion 58. The grip 60 is biased downwardly by a torsion spring 61 acting at the pivot 62, so that the handle returns to its normal condition automatically on closing the door 36. Thus in normal use, access to the fuse compartment can only be gained with the switch "off", but this safety feature can be over-ridden by competent personnel if necessary for testing or other specialised functions.

The access door 36 may be held in the open position by a latch 68. As already described, the grip 60 is biased downwardly by the torsion spring 61 in order to return it to its normal position when released and thereby to re-engage the detent on spring tongue 64. Thus if the access door 36 has been opened by defeating the interlock with the handle 38 in the "on" position, the free end of grip 60 would be bearing on the free end of cover 36 so as to urge it into its closed position, thus preventing unhindered access to the fuse compartment 16. Latch 68 comprises a tongue protruding from cover 36 so as to engage a corresponding recess 69 in the free end of grip 60. The tongue and the recess are so formed that, when they are engaged, the cover 36 is held in a stable open position, notwithstanding the urging of the torsion spring between the handle base 58 and the grip 60. However, the latching action can easily be disengaged to close the cover 36, allowing the grip 60 to return to its normal position and engage the detent of tongue 64.

Figure 3A:
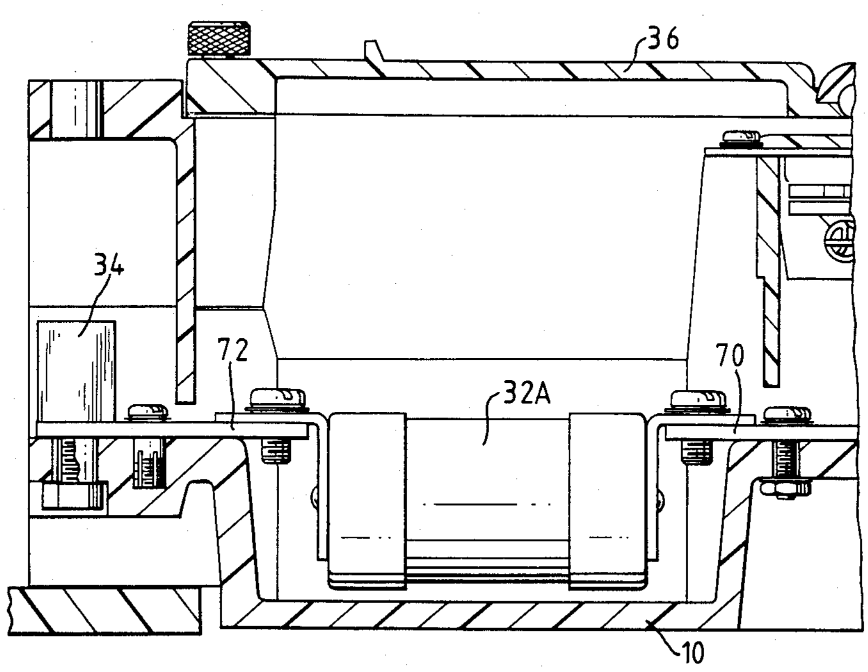
FIGS. 3A, 3B and 3C are partial cross-sections corresponding to FIG. 1, showing the use of alternative types of fuse links and mounting arrangements.
Figure 3B:
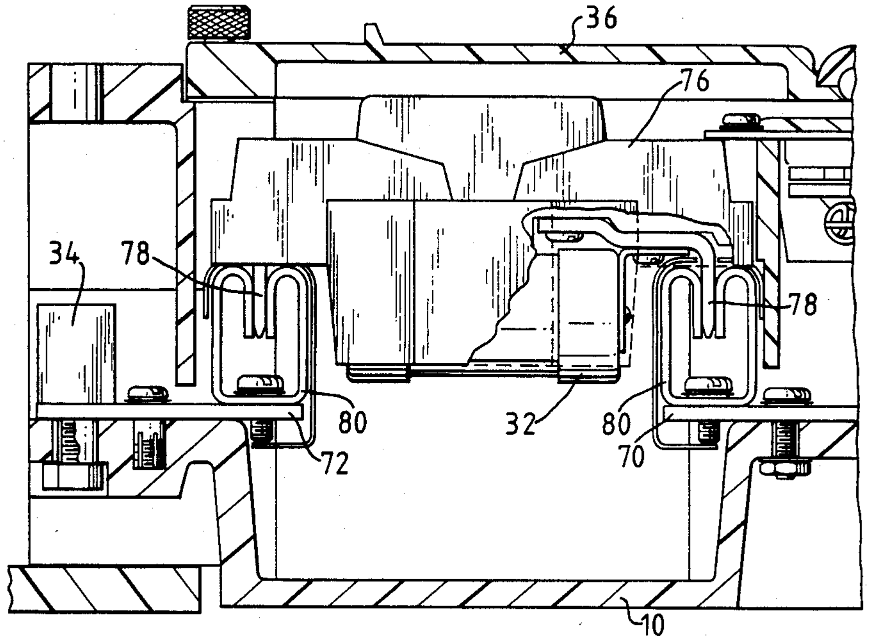
Figure 3C:
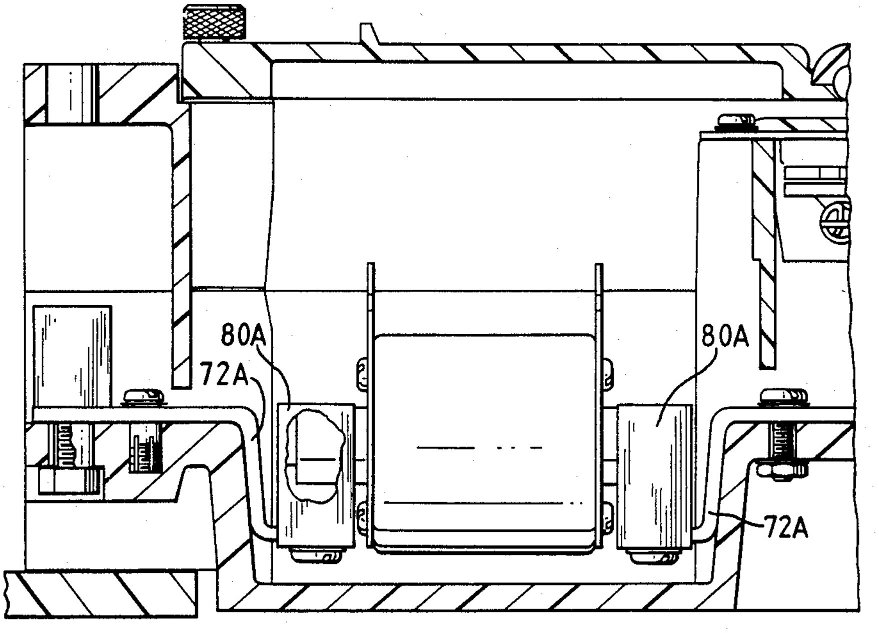
Figure 4:
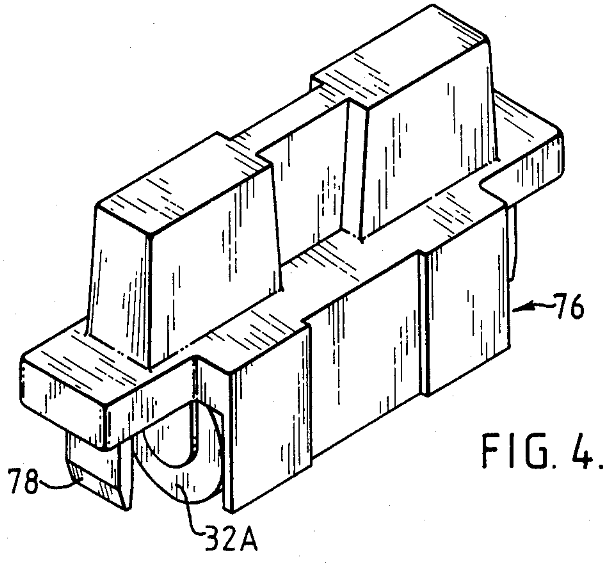
FIG. 4 is a perspective view of a fuse carrier used in FIG. 3B.

FIG. 1 shows the unit with a U.S. tag-type fuse link 32 bolted to fuse compartment lugs 70,72 via adaptor plates 74. In FIG. 3A, a U.K. fuse link 32A to the standard dimensions of British Standard No. 88 (BS 88) having offset tags, is bolted directly to the lugs 70,72. FIG. 3B also shows a BS 88 fuse link 32A, but this is mounted in a shrouded carrier 76 of moulded plastics material which has blades 78 engaging contact clips 80 bolted to the lugs 70,72. A perspective view of the carrier 76 is seen in FIG. 4. In FIG. 3C, modified lugs 70A, 72A and contact clips 80A are provided to accept German-type fuses with knife-type contacts and dimensions according to German DIN standards, and allow these to be removed with a suitable puller.

Thus the invention provides a switch-fuse unit which is compatible with existing busbar and circuit breaker assemblies to allow greater application flexibility, and can make use of the differing capabilities of fuses. The unit also possesses safety features in the handle interlocking and observation window features. Although particularly described with reference to the I-LINE distribution boards, the unit of the invention may also be used in other ways, for example in a tap-off unit for a plug-in busway.

Figure 5A:
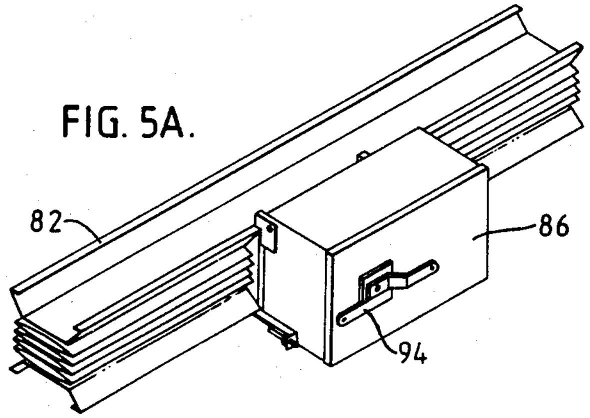
FIG. 5A illustrates in isometric view the embodiment of FIG. 5 applied to a busway.
Figure 5:
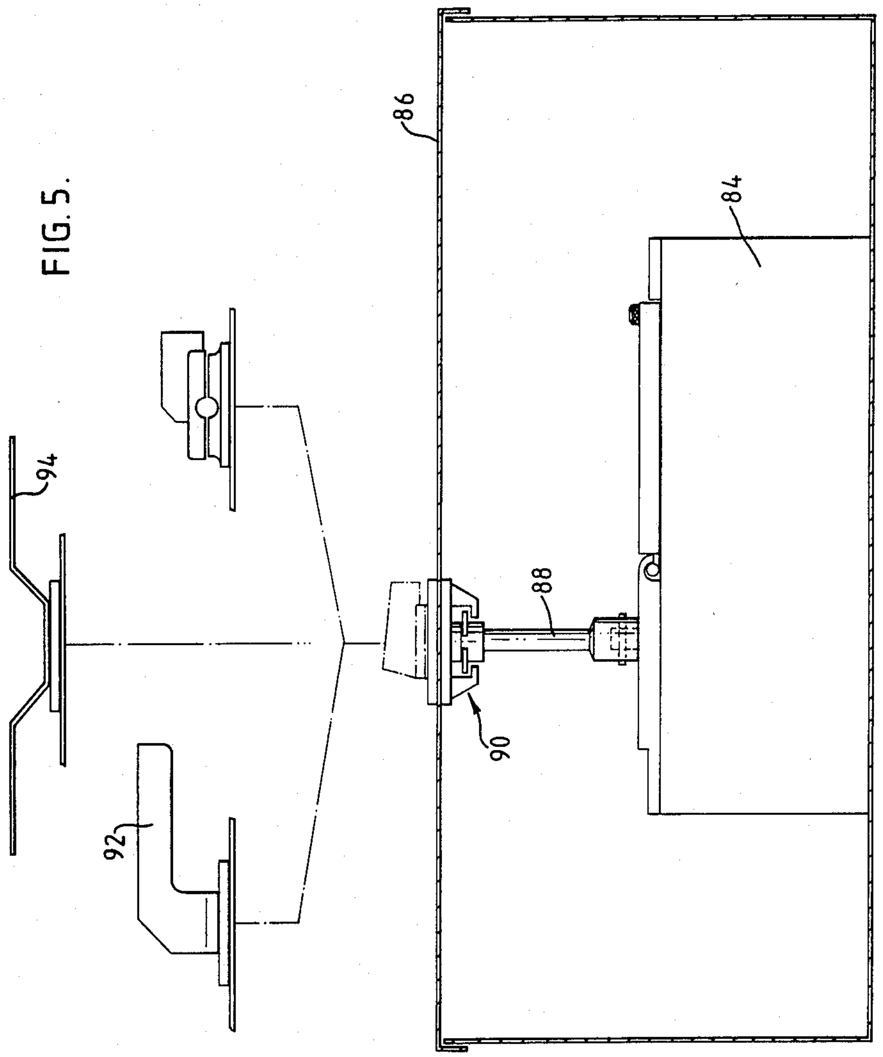
FIG. 5 is a diagrammatic cross-section of a modified form of the invention.

FIGS. 5 and 5A illustrate the unit used with a busway 82, the unit shown at 84 being mounted within an enclosure 86. The operating handle 38 is replaced by an extension shaft 88 and dog clutch 90 to which a variety of actuators may be attached as indicated in FIG. 5, e.g. a handle 92 for manual use or lever type actuator 94 for operation in an elevated position by a hooked stick.

It will be appreciated that the unit of the invention has to deal with relatively high voltages and currents within a restricted module size, typically 415 V–600 V and up to 100 A in a module of approximately 275×110×110 mm. This can give rise to problems of providing sufficient electrical clearance under arcing conditions between the switch blades and closely spaced metallic parts.

Figure 6:
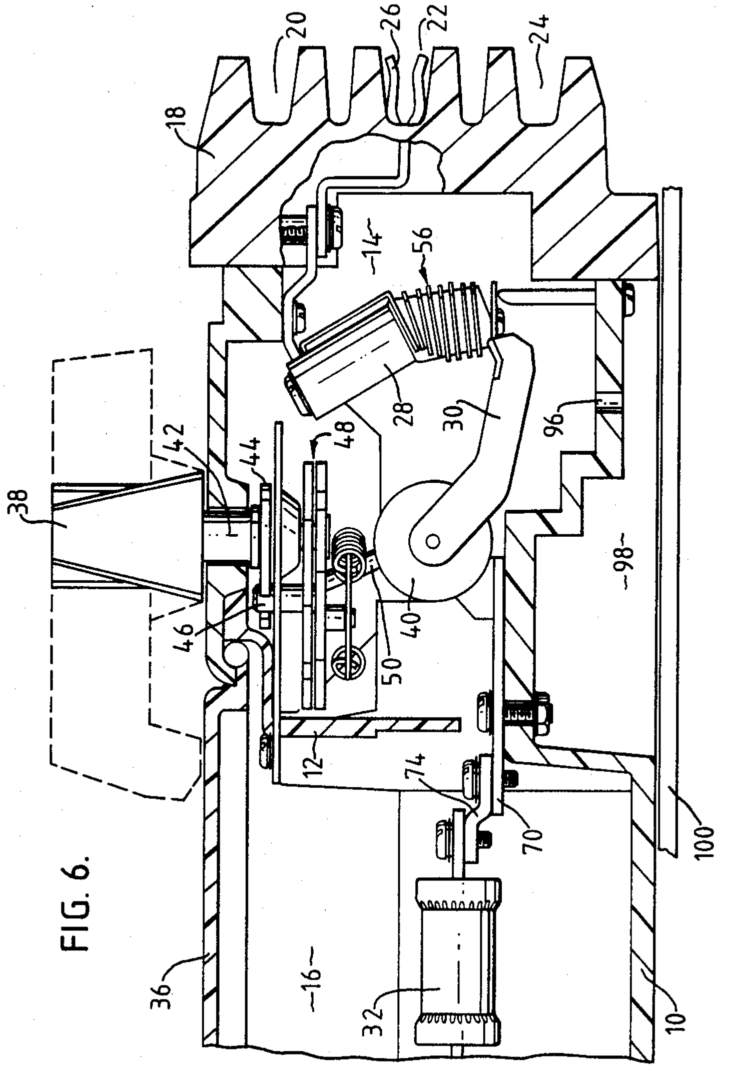
FIG. 6 is a partial cross-section, taken in the same direction as FIG. 1, of a modified embodiment.

In the modification of FIG. 6, the stationary and movable contacts are vertically reversed in comparison with FIG. 1, so that the switch blades open downwardly. Thus in FIG. 6 (in which like references denote like parts to those of the above embodiment) the stationary contact 28 is secured to the top portion of the case 10 and the shaft 40 is rotated (clockwise as seen in FIG. 6) on operating the handle 38 to the "off" position to move the blade 30 downwardly past the arc chute 56 to the position shown. With this arrangement, any arcing takes place further away from the metallic mechanism 48, and can be vented through holes such as 96 in the bottom of case 10 into a cavity 98 between the unit and a panel 100 on which it is mounted (cf. British Pat. No. 1,161,030 previously mentioned). This reduces the risk of flashover due to ionisation.

We claim:

1. A switch fuse unit comprising:

a case of generally rectangular form, the case having a number of faces, the case being divided into a first compartment and a second compartment, the case also including a hinged door providing access to the second compartment;

an inlet terminal positioned on one of said faces of the case for resilient engagement with a busbar;

two separable switch contacts electrically connected with the inlet terminal;

an outlet terminal positioned on one of said faces of the case;

a fuse link positioned within the second compartment, the fuse link being electrically connected in series with the inlet terminal, separable contacts, and outlet terminal; and a switch operating mechanism positioned within the first compartment, the switch operating mechanism including an external handle, operable to open and close the contacts in a quick-make-and-break manner, the handle being rotatable to an "on" position to block opening of the door, the handle also comprising a first portion secured to the switch operating mechanism and a second portion forming a hand grip, the second portion being hinged to the first portion to allow movement away from the case to permit opening of said hinged door the handle also comprising spring catch means normally preventing such movement but releasable by an implement.

2. The unit of claim 1, in which said handle second portion and said door are provided with cooperating latch means operable to retain the door in open position.

3. A switch fuse unit comprising:

a case of generally rectangular form, the case having a base for mounting against a flat surface and a number of faces, one of said faces being opposite the base, the case being divided into a first compartment and a second compartment, the case also including a hinged door providing access to the second compartment;

an inlet terminal positioned on one of said faces of the case for resilient engagement with a bushbar;

two switch contacts electrically connected with the inlet terminal, the switch contacts comprising a stationary contact and a movable contact for each phase, the movable contact being positioned to open in a direction towards the base and away from the face opposite the base;

an outlet terminal positioned on one of said faces of the case;

a fuse link positioned within the second compartment, the fuse link being electrically connected in series with the inlet terminal, separable contacts, and outlet terminal; and a switch operating mechanism positioned within the first compartment, the switch operating mechanism being located adjacent the face opposite the base, the switch operating mechanism including an external handle, operable to open and close the contacts in a quick-make-and-break manner said handle having means to block normal opening of said hinged door in the contacts closed position.

4. The unit of claim 3, in which the base is shaped to define with said flat surface a cavity, and said base is formed with one or more apertures venting the space adjacent the contacts into said cavity.

5. A molded case switch fuse unit including a molded case carrying a plurality of spaced fuses in a fuse compartment of said case each adapted to be connected to a respective spaced apart bus bar in a stack of overlapping bus bars extending from a multiphase power line in a generally flat panelboard with each fuse adapted to be connected to a respective bus bar by a respective spring jaw terminal in series with a respective pair of contacts in a switch compartment of said case, one of each pair of contacts being a stationary contact and the other contact being a movable contact adapted to be moved from and to engagement with the respective stationary contact, each spring jaw terminal being arranged in stacked laterally spaced positions for engaging a respective bus bar; the improvement comprising means on said case for locating said case laterally relative said bus bars and enabling movement of said case parallel to said bars for connecting each spring jaw with a respective bus bar, a unitary insulating shroud at one end of said case having parallel laterally extending portions overlapping each of said spring jaw terminals and a portion of the respective bus bar connected thereto, a mechanism operable in one direction for engaging each of said movable contacts with a respective stationary contact and operable in the opposite direction for disengaging each of said movable contacts from a respective stationary contact, a top portion on said case overlapping said switch compartment, an access door pivotally supported on said top portion in overlapping position relative said switch compartment and independently movable about a first axis extending parallel to said bars for providing access to said fuse compartment, a shaft projecting through said top portion and having a handle thereon for moving said shaft, said handle formed of two portions with one handle portion receiving said shaft and both handle portions movable simultaneously in one direction about a second axis transverse to said axis for operating said mechanism in said one direction to engage a respective movable contact with a respective stationary contact and locate the other handle portion in one position overlapping said door for preventing access to said fuse compartment and movable in the other direction for operating said mechanism in said other direction to open said contacts and locate the other handle portion for enabling said door to be opened, means pivotally supporting the other handle portion on said first handle portion for pivoting movement about a third axis to enable said other portion to be pivoted from said one position overlapping said door and enable access to the respective compartment, and a detent extending between said handle portions for preventing pivoting movement of the other handle portion about said third axis and manually movable in a selected direction for enabling the other handle portion to be pivoted relative the one handle portion when said other handle portion overlaps said door for enabling said door to be opened when said handle is in said one position and said mechanism is operated for maintaining said contacts closed.

6. The switch unit claimed in claim 5 in which said means pivotally supporting said other handle portion includes a pair of legs on said other portion extending along opposite edges of said one handle portion, and a torsion spring extends along said third axis for pivoting said other handle portion about said third axis in response to manual movement of said detent in said selected direction.

7. A molded case switch fuse unit including a molded case carrying a plurality of spaced fuses in a fuse compartment of said case each adapted to be connected to a respective spaced apart bus bar in a stack of overlapping bus bars extending from a multiphase power line in a generally flat panelboard with each fuse adapted to be connected to a respective bus bar by a respective spring jaw terminal in series with a respective pair of contacts in a switch compartment of said case, one of each pair of contacts being a stationary contact and the other contact being a movable contact adapted to be moved from and to engagement with the respective stationary contact, each spring jaw terminal being arranged in stacked laterally spaced positions for engaging a respective bus bar; the improvement comprising location means on said case for locating said case laterally relative said bus bars and for connecting each spring jaw with a respective bus bar, an insulating shroud at one end of said case having parallel laterally extending portions overlapping each of said spring jaw terminals and a portion of the respective bus bar connected thereto, a mechanism operable in one direction for engaging each of said movable contacts with a respective stationary contact and operable in the opposite direction for disengaging each of said movable contacts from a respective stationary contact, a top portion on said case overlapping said switch compartment, an access door pivotally supported on said top portion and independently movable about a first axis extending approximately parallel to said bars for providing access to said fuse compartment, a shaft projecting through said top portion and having a handle thereon for moving said shaft, said handle formed of two portions with one handle portion receiving said shaft and both handle portions movable simultaneously in one direction about a second axis to engage a respective movable contact with a respective stationary contact and locate the other handle portion in one position overlapping said door for preventing access to said fuse compartment and movable in the other direction for operating said mechanism in said other direction to open said contacts and locate the other handle portion for enabling said door to be opened, support means for pivotally supporting the other handle portion on said first handle portion for pivoting movement about a third axis to enable said other portion to be pivoted from said one position overlapping said door and enable access to the respective compartment, and restraint means for preventing said support means from pivoting from said one position, the restraint means being releasable to allow the support means to pivot and enable access to the respective compartment.

* * * * *